United States Patent [19]

Furuse

[11] Patent Number: 4,574,602
[45] Date of Patent: Mar. 11, 1986

[54] WHEEL LOCKING DEVICE FOR AUTOMOBILE

[75] Inventor: Mitsuru Furuse, Minami-ashigara, Japan

[73] Assignee: Taka-Ai Co., Ltd., Tokyo, Japan

[21] Appl. No.: 535,872

[22] Filed: Sep. 26, 1983

[30] Foreign Application Priority Data

Mar. 29, 1983 [JP] Japan .................................. 58-53287

[51] Int. Cl.$^4$ ........................................... F16B 41/00
[52] U.S. Cl. ................................... 70/232; 70/259; 70/260; 70/276; 411/427; 411/429; 411/910
[58] Field of Search ................................ 70/229–232, 70/259, 260, 276; 411/910, 427, 429, 432

[56] References Cited

U.S. PATENT DOCUMENTS

| 703,016 | 6/1902 | Tash | 70/230 |
|---|---|---|---|
| 1,098,103 | 5/1914 | Freschl | 70/260 |
| 1,349,491 | 8/1920 | Burton | 70/230 |
| 1,625,901 | 4/1927 | Lay | 70/232 |
| 1,733,245 | 10/1929 | Snelling | 70/230 |
| 1,810,195 | 6/1931 | Wharam | 70/260 |
| 1,883,032 | 10/1932 | Smith | 70/259 |
| 3,837,195 | 9/1974 | Pelto | 70/276 |
| 3,952,563 | 4/1976 | Yamashita | . |
| 3,978,698 | 9/1976 | Ono | 70/231 X |
| 4,336,698 | 6/1982 | Hurd | 70/231 |

Primary Examiner—Kenneth J. Dorner
Assistant Examiner—Lloyd A. Gall
Attorney, Agent, or Firm—Robbins & Laramie

[57] ABSTRACT

A wheel locking device is a locking means wherein one of a plurality of fastening nuts with which a wheel plate covering both the inner face part of a vehicle tire and the external face of a wheel is secured to the wheel by a lockable nut which cannot be removed without using a key.

4 Claims, 14 Drawing Figures

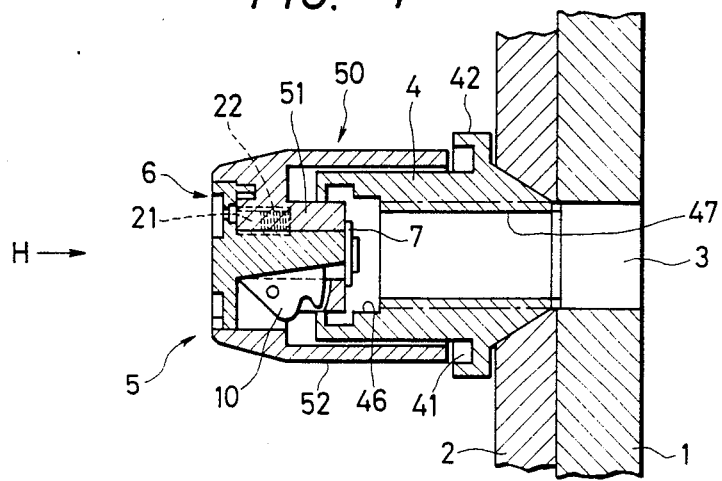
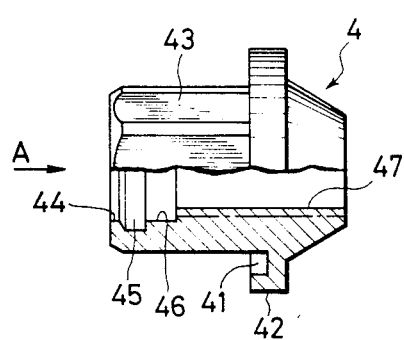
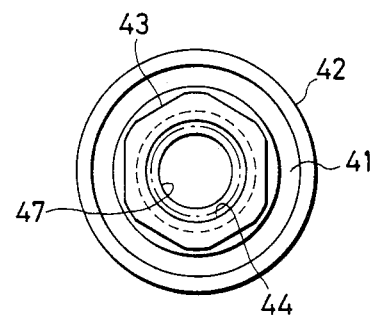
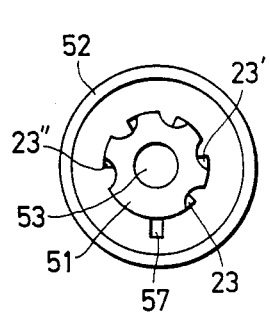
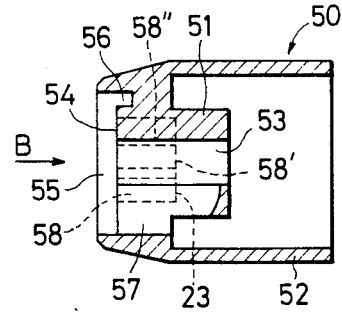
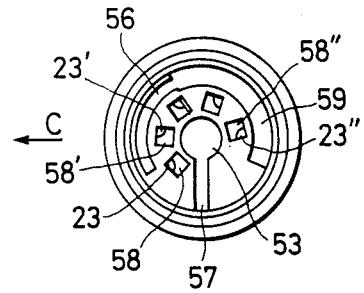

WHEEL LOCKING DEVICE FOR AUTOMOBILE

BACKGROUND OF THE INVENTION

The invention relates to a wheel locking device for automobiles.

Since the wheel plate of automobiles have increased in value and become an expensive accessary, the wheel plate is frequently stolen along with the tire. The wheel locking device is provided for the purpose of preventing this type of theft, however, the device, if fastened by use of an insertion key or a cylinder lock, may be easily undone with a passkey or hand tool. For this reason, magnet keys have recently replaced the key and the lock. With magnet keys, however, there exists a rare chance that the locking device may be violently broken open by use of tools. Additionally, there exists a disadvantage that it may fail in use due to penetration of rain water or flushed water for cleaning.

BRIEF SUMMARY OF THE INVENTION

The purpose of the invention is to provide a wheel locking device, particularly, a safety wheel lock which may be readily fastened and opened. Once fastened, the wheel locking device will not be openable with a screwdriver or any other tool, and will remain free of impairment in function caused by penetration of rain water or flushed water for cleaning.

BRIEF DESCRIPTION OF THE DRAWINGS

FIG. 1 shows a transverse cross sectional view of a wheel locking device in accordance with the present invention, and FIGS. 2 and 3 show a wheel nut;

FIG. 2 being a side view with the lower part thereof shown in section, and

FIG. 3 being a front view taken in the direction of arrow A in FIG. 2.

FIGS. 4, 5 and 6 show a wheel lock external sleeve;

FIG. 4 being a transverse sectional view, FIG. 5 being a front view taken in the direction of arrow B in FIG. 4 and FIG. 6 being a rear view taken in the direction of arrow C in FIG. 4.

FIG. 7 being a transverse sectional view thereof,

FIG. 8 being a side view taken in the direction of arrow D in FIG. 7 and

FIG. 9 being a side view taken in the direction of arrow E in FIG. 7.

FIG. 10 being a side view thereof and FIG. 11 being a plan view taken in the direction of arrow F in FIG. 10.

DETAILED DESCRIPTION OF THE INVENTION

Figure 8:
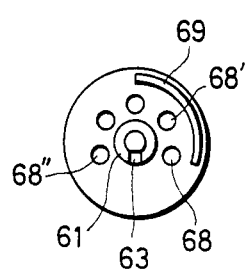
FIGS. 7, 8 and 9 show a rotor.

This invention comprises a wheel lock external sleeve having a rotor receiving part at the head of, and a cylindrical shell at the rear of, said external sleeve. A rotor is rotatably engaged in said rotor receiving part and has a key face fitting recess on its head face. A latch is engaged in the rotary shaft of said rotor, and a wheel nut fits inside said wheel lock external sleeve. Said wheel lock external sleeve has fine slots in the rotor receiving part each of which contains a small cylindrical magnet and a spring which urges the magnet in the direction of the head of the external sleeve. An arcuate groove on the head of the external sleeve contains a rotor pushing spring. A latch engagement groove on one side of the rotor receiving part holds said latch therein. The rotor has engagement holes, into each of which, a fine cylindrical magnet is engaged so as to integrate said wheel lock external sleeve with the rotor. An arcuate projection along the periphery of the head of the rotor fits into the arcuate groove on the head of said wheel lock external sleeve. The rotary shaft has a tapered groove into which said latch is partially engaged and fit. The wheel nut has a flange throughout the rimmed head part thereof to allow engagement with said latch for locking said wheel lock external sleeve to the nut. The magnet containing fine slots in the rotor receiving part of the wheel lock external sleeve communicate with a gap between the wheel lock external sleeve and the external periphery of the wheel nut. A grooved flange around the base part of the wheel nut permits engagement between said wheel nut and the end of the wheel lock external sleeve.

Referring to the drawings, the present invention is hereinafter described. FIG. 1 is a sectional view of a wheel locking device, showing the condition where a wheel lock 5, of the embodiment in accordance with the invention, is attached to a wheel nut 4, in accordance with the invention, which is screwed to a wheel fitting bolt to fasten a wheel 2 to a wheel hub 1. Said wheel lock 5 is an integrated means comprising a wheel locking external sleeve 50, consisting of a rotor receiving part 51 and a cylindrical body 52, and a rotor 6, said rotor being rotatably centered in said rotor receiving part 51. The wheel nut 4, as shown in FIGS. 2 and 3 (FIG. 2 is a side view with the lower half shown in section and FIG. 3 is a front view taken in the direction of arrow A), has a grooved flange 42 with a groove 41 immediately above the part at which said wheel 2 is fastened. The wheel nut also has a hexagonal sleeve 43 at the upper part thereof. Said hexagonal sleeve 43 has at its internal extremity a flange 44 on which a lock groove 45 is formed. An undercut 46, for receiving the rotor receiving part 51 of said wheel lock external sleeve 50, is formed at the rear of said lock groove 45. A screw thread 47, for fastening the wheel 2, is threadably engaged with said wheel engagement bolt 3, and is formed at the rear of the undercut.

Said wheel lock external sleeve 50 is also shown in FIGS. 4, 5 and 6. FIG. 4 is a transverse sectional view, FIG. 5 is a front view taken in the direction of arrow B and FIG. 6 is a rear view taken in the direction of arrow C. The wheel lock external sleeve 50, as mentioned above, has a rotor receiving part 51 placed in the center of the cylindrical body 52. A rotor's key face fitting recess 55 is formed on the upper face 54 of said rotor receiving part 51. An arcuate groove 56 is partially formed along the periphery of the upper face 54 of said rotor receiving part. Said arcuate groove is adapted for sliding the rotor's arcuate projection (described hereinafter) therein. An engagement slot 57 for a latch (described hereinafter) is partially formed in the rotor receiving part 51. The engagement slot extends from the rotor engagement hole 53 to the external end of the rotor receiving part 51. A plurality of magnet containing fine holes (square holes) 58, and 58' to 58" are arranged about said rotor engagement hole 53.

Figure 7:
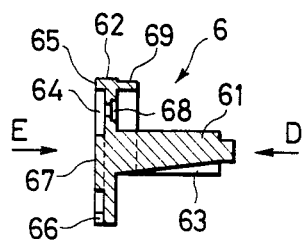
Figure 9:
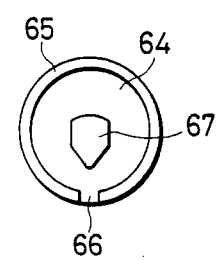
Figure 10:
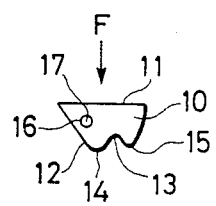
FIGS. 10 and 11 show a latch 10.
Figure 11:
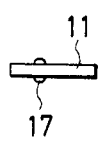

A rotor 6 which is rotatably mounted in the center of said wheel lock external sleeve 50 is shown in FIGS. 7, 8 and 9. FIG. 7 is a transverse section thereof, FIG. 8 is a side view taken in the direction of arrow D and FIG. 9 is a side view taken in the direction of arrow E. The rotor 6 comprises a rotary shaft 61 fit in the central engagement hole 53 of the rotor receiving part 51 of said wheel lock external sleeve. A keying block 62 is integrally formed at the end of the rotary shaft 61. Said rotary shaft 61 has at one side thereof a tapered groove 63 which engages the ridge of a latch (described hereinafter). The keying block 62 on rotary shaft 61 has both a recess 64 on the upper face thereof and a notch 66 at one position on a peripheral projection rim 65 of said recess 64. A keying boss 67 is projected at the center of said recess 64. A key (not described herein), having a recess which is to be fit on said keying boss 67, is capable of interacting with the wheel lock by inserting a projection on the end of the key into a notch 66 on the peripheral projecting rim 65 of said keying block 62. Said keying block 62 has at its rear several engagement holes 68 and 68' to 68" for engagement with magnets. The keying block 62 also has a rotor turning arcuate projection 69 disposed partially along its periphery, and particularly at a position so as to engage with the arcuate groove 56 formed along the periphery of the upper face of the rotor receiving part of said wheel lock external sleeve. Said arcuate projection 69 is pushed by a rotor pushing spring (described hereinafter) which is disposed in said arcuate groove 56, whereby the rotor 6 may be turned. FIGS. 10 and 11 show a latch 10 which is inserted and fit into a latch engagement groove 57 of the rotor receiving part 51 of said wheel lock 5. FIG. 10 is a side view and FIG. 11 is a plan view taken in the direction of arrow F. The latch 10, as shown by the drawings, is an approximately triangular plate which is defined by a linear face 11 and a protruding face 12 which has a dent 13 at the vertex thereof so that an upper protuberance 14 and a lower protuberance 15 are formed at both sides thereof. An aperture 16 is in the middle of protruding face 12, adjacent to the extremity of the latch, and a small rubber ball 17 is urged thereinto. When said latch 10 is inserted into the latch engagement groove 57, the groove walls thereof are abutted by said rubber ball 17 which acts as a pivot while the latch is turned in the latch engagement groove.

Figure 12:
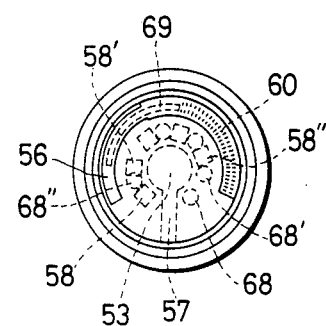
FIG. 12 shows a front view of a wheel lock with a rotor mounted to the wheel lock external sleeve.

Each part of the wheel locking device has been generally described in the preceding portion of the specification and assembly of the wheel lock 5 is now detailed as follows. As shown in FIGS. 1 and 4, the latch 10 is engaged in the latch engagement groove 57 of the rotor receiving part 51 before the rotor pushing spring 60 (shown by the dots in FIG. 14) is placed in an arcuate spring groove 59 (a groove following the groove 56 of FIG. 5 and a little wider than it). After the tapered groove 63 (FIG. 7) of the rotor 6 is aligned with the latch engagement groove 57 of said rotor receiving part 51 (so that the upper linear face 11 of the latch 10 may be fit in said tapered groove 63), the rotor 6 is inserted into the rotor engagement hole 53 of the rotor receiving part 51 until the keying block 62 of the rotor 6 is fit in the key face fitting recess 55 of the wheel lock external sleeve 50. A washer 7 is fit around the extremity of the rotor's rotary shaft 61 before caulking, so that said rotor 6 is rotatably mounted to the wheel lock external sleeve 50. The front view (taken in the direction of arrow H in FIG. 1) of the assembly after the mounting is shown in FIG. 12. As shown in the drawing, the rotor 6, after being mounted, is placed in such a position that the rotor pushing spring 60 which is disposed in the arcuate groove 56 of the wheel lock 5 is kept compressed by the arcuate projection 69 of the rotor 6. After being mounted as mentioned above, the rotor 6 is kept secured by the wheel lock external sleeve 50. This is accomplished by interposing the latch 10 between the tapered groove 63 on the rotor's rotary shaft and the latch engagement groove 57 on the wheel lock external sleeve 50. A square hole 58 (indicated by a dotted line in FIG. 12), which is drilled in the rotor receiving part 51 is adapted for holding both a small cylindrical magnet 21 (shown by a dotted line in FIG. 1) and the pushing spring 22 for said magnet. An engagement hole 68 (indicated by a dotted line in FIG. 12), for the small magnet 21, is formed on the rear face of the keying block 62 of the rotor 6.

Figure 13:
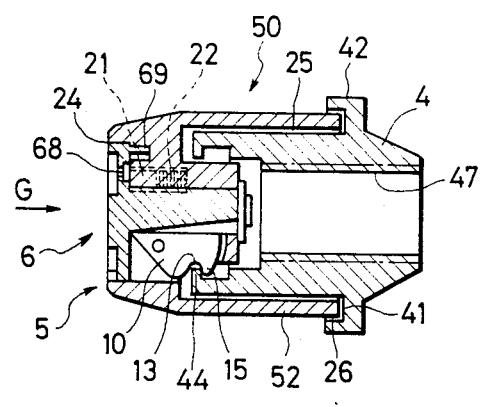
FIG. 13 is a transverse sectional view wherein the wheel lock is being fastened to the wheel nut and FIG. 14 is a front view taken in the direction of arrow G in FIG. 13.
Figure 14:
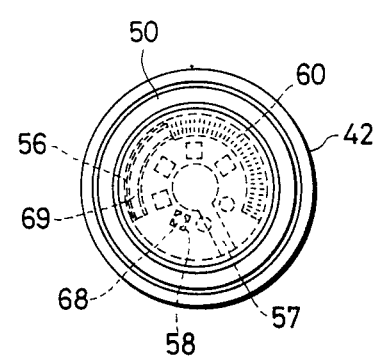

The wheel lock, having been assembled as described above, is attached to the wheel nut 4 and squeezed thereon. The wheel lock 5 has the latch 10 fit at its upper linear face 11 on the tapered groove 63 of the rotor's rotary shaft 61. The upper protuberance 14, of said latch 10, is inserted inside the engagement groove 57 of the rotor receiving part 51 (as shown in FIG. 1). The head of the wheel nut 4 is shifted to the lower face of the upper protuberance 14 to force said upper protuberance 14 of said latch upward and the lower protuberance 15 clockwise, hence allowing the head projecting flange 44 to fall into the dent 13 of said latch 10. This condition is shown in FIGS. 12 and 13. FIG. 13 is a transverse sectional view and FIG. 12 is a front view taken in the direction of arrow G. When the latch 10 is turned clockwise, its upper linear face 11 comes out of the tapered groove 63 of the rotor's rotary shaft 61. This movement allows the arcuate projection 69 of said rotor to be moved by the rotor's pushing spring 60 into the arcuate spring groove 59 of the arcuate groove 56 formed on the wheel lock. As shown in FIG. 14, the rotor is turned until the arcuate projection 69 is restricted by the end of the arcuate groove 56, and the magnet engagement holes 68 on the rear face of the rotor 6 are aligned with the magnet containing small holes 58. Each of the small cylindrical magnets 21, inside said small holes 58, are forced into said engagement holes 68 by the pushing springs 22 so as to bring the wheel lock external sleeve 5 and the rotor 6 into an integrated relation. The above-described actions bring the wheel lock 5 and the wheel nut 4 into a relation where the wheel lock 5 is allowed to be turned around the wheel nut 4 but cannot be pulled out from the same, because, the projecting flange 44 of the wheel nut 4 falls into the dent 13 on the latch 10.

To unlock a fastened wheel lock, a key which contains magnets is inserted into the head recess 64 of the rotor 6 of the wheel lock. The magnet in the key repels the small cylindrical magnets 21 inside the wheel lock which, in turn, force the pushing springs 22, into respective magnet containing small holes 58 of the rotor receiving part 51. These actions serve to undo the fastened relation between the rotor 6 and the wheel lock external sleeve 50. The rotor 6 is turned until the linear face 11, of latch 10, coincides with the tapered groove 63 of the rotor's rotary shaft 61. If the wheel lock 5 is pulled, with the rotor in this position, the linear face 11 of the latch 10 will fit into said tapered groove 63, and the engagement of the projecting flange 44 of the wheel nut 4 and the latch 10 will be loosened so as to allow the wheel lock to be removed from the wheel nut. The key for unlocking contains magnets at corresponding positions to the repelling magnets in the wheel lock (faced magnetic poles being the same), while the wheel lock external sleeve, as mentioned above, has a plurality of magnet-containing holes. These factors provide for an infinite number of combinations of the magnetic poles, thereby preventing the forging of a duplicate key.

The bottom part of each magnet containing hole 58 and 58' to 58" in the rotor receiving part 51 is connected to the bottom face of the rotor receiving part 51 by a through-hole 23 and 23' to 23" (FIGS. 4, 5 and 6). Therefore, if any rain water, flushed water or the like, penetrates the gap 24 between the head part of the wheel lock external sleeve and the engagement face of the rotor 6 and enters the magnet containing holes 58 and 58' to 58", said water will travel from said through-holes 23 and 23' to 23" formed at the bottom of said square holes through a gap 26 (FIG. 13) and be discharged outside. The gap 26 runs between the wheel nut 4 and the wheel lock external sleeve 52, and then continues on between said external sleeve 52 and the wheel nut groove 41 before opening to the outside. This drainage mechanism prevents any impairment of the locking property due to corrosion of the small cylindrical magnets 21 and related pushing springs 22 caused by water deposited in said magnet containing hole.

Moreover, the chance that the wheel lock may be violently broken open by forcing a screwdriver or other similar device into the gap between the wheel lock external sleeve 52 and the wheel nut 4, is greatly reduced by the close fit of the wheel lock external sleeve 52 into the groove 41 of the groove flange 42 after the wheel lock 5 is locked to the wheel nut 4.

As described above, the wheel lock device of the present invention provides extreme ease in the opening and fastening of the lock. The reliability and firmness with which the locking device is fastened essentially obviates any chance of said locking device being violently broken open with a screwdriver or a similar device. Additionally, the wheel lock is free from any malfunction attributable to the penetration of rain water or flushed water for cleaning. The wheel lock provides these many advantages.

I claim:

1. A wheel locking device for an automobile comprising a wheel lock external sleeve having a head and a rear, and a rotor receiving part at its head and a cylindrical shell at its rear, a rotor rotatably engaged in said rotor receiving part, wherein said rotor includes both a head face having a key face engagement recess, and a rotary shaft, a latch engaged in the rotary shaft of said rotor, and a wheel nut fitted inside said wheel lock external sleeve, wherein said nut includes a rimmed head part, said wheel lock external sleeve having fine slots in the rotor receiving part formed at the head thereof, said fine slots containing small cylindrical magnets and springs which urge the magnets in the direction of the head thereof, said wheel lock external sleeve also having an arcuate groove on the head thereof for containing a rotor pushing spring, and further having a latch engagement groove at one side of the rotor receiving part for holding said latch therein; said rotor having engagement holes, into each of which said small cylindrical magnets are engaged so as to integrate said wheel lock external sleeve and the rotor with each other, said rotor also having an arcuate projection along the periphery of the head of the rotor that fits into the arcuate groove formed on the head of said wheel lock external sleeve, wherein said rotor further includes a tapered groove into which said latch is partially engaged and fitted; said wheel nut having a flange throughout the rimmed head part thereof which is engageable with said latch for locking said wheel lock external sleeve to the nut.

2. A wheel locking device for an automobile as claimed in claim 1 further comprising a small rubber ball disposed at one position in the latch, said small rubber ball resiliently abutting both side faces of the latch engagement groove formed in the rotor receiving part of the wheel lock external sleeve so as to act as a pivotal point about which the latch is turned.

3. A wheel locking device for an automobile as claimed in claim 1 wherein the magnet containing fine slots of the rotor receiving part of the wheel lock external sleeve communicate with the gap between wheel lock external sleeve and the periphery of the wheel nut.

4. A wheel locking device for an automobile as claimed in claim 3 further having a grooved flange around a base part of the wheel nut so as to fit the end of the wheel lock external sleeve thereinto.

* * * * *